(12) United States Patent
Koch et al.

(10) Patent No.: US 12,587,061 B2
(45) Date of Patent: Mar. 24, 2026

(54) ELECTRIC MOTOR

(71) Applicant: Brose Fahrzeugteile SE & Co. Kommanditgesellschaft, Würzburg, Würzburg (DE)

(72) Inventors: Kevin Koch, Fürth (DE); Michael Düncher, Würzburg (DE); Daniel Hirsch, Höchberg (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 244 days.

(21) Appl. No.: 18/175,715

(22) Filed: Feb. 28, 2023

(65) Prior Publication Data

US 2023/0208251 A1     Jun. 29, 2023

Related U.S. Application Data

(63) Continuation of application No. PCT/EP2021/073284, filed on Aug. 23, 2021.

(30) Foreign Application Priority Data

Aug. 31, 2020     (DE) ..................... 10 2020 210 945.1

(51) Int. Cl.
*H02K 7/08*          (2006.01)
*H02K 7/00*          (2006.01)

(52) U.S. Cl.
CPC .............. *H02K 7/08* (2013.01); *H02K 7/003* (2013.01)

(58) Field of Classification Search
CPC .................................. H02K 7/08; H02K 7/003
See application file for complete search history.

(56) References Cited

U.S. PATENT DOCUMENTS

| | | |
|---|---|---|
| 4,340,830 A | 7/1982 | Hoyer-Ellefsen |
| 10,014,742 B2 | 7/2018 | Saum et al. |
| 10,876,466 B2 | 12/2020 | Akiyama et al. |
| 2014/0064944 A1 | 3/2014 | Li et al. |

FOREIGN PATENT DOCUMENTS

| | | |
|---|---|---|
| DE | 3044732 A1 | 9/1981 |
| DE | 19843226 A1 | 3/2000 |
| DE | 102006052975 A1 | 5/2008 |
| DE | 102010029304 A1 | 12/2010 |
| DE | 102013209202 A1 | 11/2014 |
| DE | 112018001379 T5 | 11/2019 |
| JP | 2000291622 A | 10/2000 |

*Primary Examiner* — Terrance L Kenerly
(74) *Attorney, Agent, or Firm* — Laurence A. Greenberg; Werner H. Stemer; Ralph E. Locher

(57)          ABSTRACT

An electric motor contains a motor shaft which is arranged in a motor housing. The motor shaft is rotatably mounted about a rotational axis in at least one rolling or ball bearing, which sits in a bearing receiving area and contains an outer ring and an inner ring fixed to the motor shaft. The outer ring of the rolling bearing is pretensioned by a spring disc which sits in the bearing receiving area and has a number of wave trains with alternatingly axially projecting half wave trains, and the spring disc has a number of centering elements on the inner circumference. The centering elements rest against the motor shaft when the spring disc is untensioned and is arranged at a distance to the motor shaft when the spring disc is tensioned.

9 Claims, 5 Drawing Sheets

ELECTRIC MOTOR

CROSS-REFERENCE TO RELATED APPLICATION

This application is a continuation, under 35 U.S.C. § 120, of copending International Patent Application PCT/EP2021/073284, filed Aug. 23, 2021, which designated the United States; this application also claims the priority, under 35 U.S.C. § 119, of German Patent Application DE 10 2020 210 945.1, filed Aug. 31, 2020; the prior applications are herewith incorporated by reference in their entirety.

FIELD AND BACKGROUND OF THE INVENTION

The invention relates to an electric motor, with a stator and a rotor, which is arranged non-rotatably on a motor shaft which is mounted in a motor housing so that it can move in rotation about an axis of rotation. An electric motor is here understood in particular to be an electronically commutated steering motor of a motor vehicle.

Motor vehicles usually have a number of adjustable parts, for example a steering mechanism, a seat adjustment mechanism, an activatable lock, a window lifter, and an adjustable sliding roof which can be adjusted by means of a respective associated electromechanical drive (actuating or adjusting drive) and can be moved between different adjustment positions. In particular in the case of a steering motor or in the case of a brake booster of a motor vehicle, a brushless electric motor as a three-phase machine is generally used.

Such an electric motor generally has a stator with a number of stator teeth which are arranged, for example, in a star shape and carry an electrical rotating-field or stator winding in the form of individual coils which for their part are wound from insulated wire. The coils are assigned with their coil ends (winding wire ends) to individual strands or phases and are interconnected in a predetermined fashion and lead to phase terminals for supplying current to the rotating-field winding.

In the case of a three-phase electronically commutated electric motor, the stator has three phases and hence at least three phase conductors or phase windings to each of which electric current is applied phase-shifted in order to generate a magnetic rotating field in which a rotor, usually provided with permanent magnets, rotates. The phase ends of the phase windings lead to motor electronics for controlling the electric motor. The coils of the rotating-field winding are here connected in a star connection or in a delta connection and electrically contact the three phase terminals.

The rotor sits non-rotatably (fixed to the shaft) on a motor shaft (rotor shaft) which is mounted rotatably in at least one bearing, in particular in a rolling or ball bearing. The bearing is accommodated in a bearing retainer (bearing seat) of a bearing plate which can be inserted, for example, as a so-called B-side bearing plate into a motor housing or can be integrally formed thereon. An axial housing collar of the, for example, pot-like or hollow cylindrical motor housing can form on this housing side of the B-side bearing plate a receptacle for a rotary encoder and/or for control electronics of the electric motor.

A further ball bearing for rotatably mounting the motor shaft can be attached to an A-side bearing plate closing the motor housing or arranged in a bearing retainer there. On the housing side of the A-side bearing plate, the electric motor can be coupled (connected) to a steering rod of a vehicle steering mechanism or to another actuating element (adjustable part) of the vehicle via its motor shaft by means of a gearbox.

In the case of a ball bearing (rolling bearing) which typically has an inner ring (ball bearing inner ring) fixed to the shaft and an outer ring (ball bearing outer ring), bearing shims are often provided for axially securing, positioning, or pretensioning the ball bearing in the bearing seat in order to achieve optimally play-free running of the motor shaft and a reduction in bearing noise. For this purpose, so-called spring washers and/or tension washers can be used in order to compensate axial tolerances between housing parts and the bearing seat of the motor shaft, i.e. to position or pretension the ball bearing axially and to eliminate bearing play between the ball bearing rings. For example, the ball bearing outer ring and the ball bearing inner ring can for this purpose be shifted relative to each other by means of a wave-shaped spring washer (wave spring washer). If the spring washer is not supported on the base of a bearing retainer or in the bearing seat and instead bears, for example, on the opposite side of the ball bearing, against the latter, a tension washer is typically required to hold the spring washer at the desired position on the motor shaft.

These wave-shaped spring washers usually have a circular through opening, encircled by an annular washer, for the motor shaft. The internal diameter of the through opening is here often chosen such that the spring washers do not touch the ball bearing inner ring in order to avoid an undesired increase in the frictional torque. However, a disadvantage here is that, because of the relatively large internal diameter of the through opening, during mounting an undesired displacement or jamming of the spring washer can occur in the region of the bearing retainer, for example between the ball bearing (rolling bearing) and a bearing cover or a ball bearing cap.

SUMMARY OF THE INVENTION

The object of the invention is to provide an electric motor, in particular an electronically commutated internal rotor motor, which makes as little noise as possible in motor mode. In particular, it is intended that reliable positioning, pretensioning, and/or tensioning of the rolling or ball bearing is achieved. Preferably, it is intended that as fault-free mounting as possible is ensured of a spring washer for pretensioning (positioning) the ball bearing, in particular its outer ring.

This object is achieved according to the invention with the features of the independent claim. Advantageous embodiments and developments are the subject of the dependent claims.

The electric motor has a stator and a rotor, which is arranged fixed to the shaft and hence non-rotatably on a motor shaft which is mounted so that it can move in rotation about an axis of rotation in at least one rolling bearing, preferably in a ball bearing, with an outer ring and with an inner ring, fixed to the motor shaft, inside a motor housing. The rolling or ball bearing is arranged in an in particular axially drawn-in bearing retainer preferably provided in a bearing plate referred to below also as a housing bearing plate. This bearing retainer has in a suitable fashion a through opening for the motor shaft. The electric motor is preferably an electronically commutated inner rotor motor, in particular a steering motor of a motor vehicle.

The outer ring of the rolling bearing is pretensioned (positioned) by means of a wave-shaped spring washer. The latter sits in a suitable fashion, fixed with the housing, in the bearing retainer on that bearing side of the housing bearing plate facing away from the rotor. The spring washer is traversed by the motor shaft in a suitable fashion. The spring washer has a shaft opening, encircled (surrounded) by an annular washer body, for the motor shaft. The annular washer body of the spring washer has, in the circumferential direction of the washer, a number of wave trains with alternatingly axially flared half-waves or half-wave trains. In other words, the spring washer or its annular washer body is configured or shaped like a wave with multiple wave troughs and wave peaks. In particular, the spring washer has three wave trains, i.e. three wave periods with three half-waves or half-wave trains oriented or flared in one axial direction and three which are oriented or flared in the other axial direction.

The spring washer has a number of radially inward directed centering elements at the inner circumference of the annular washer body. They bear against the motor shaft when the spring washer is untensioned. As a result, the spring washer can be assembled with virtually no faults by the spring washer being supported on the motor shaft when mounted via the centering elements and is hence centered on the said motor shaft. Tilting, displacement, or jamming of the spring washer in the bearing retainer are thus reliably prevented.

In the tensioned state of the spring washer, when the latter is compressed or pretensioned axially in the course of being mounted, the centering elements are spaced apart from the motor shaft, in particular with the formation of a gap. In other words, when the wave-shaped spring washer is tensioned or pretensioned, the centering elements yield radially outward and thus move out of contact with the motor shaft. As a result, friction-free running of the motor shaft rotating in motor operation is produced in the region of the spring washer and an increase in frictional torque is avoided. The wave-shaped spring washer with the centering elements is preferably a stamped/bent part made from sheet metal or preferably from a strip of spring steel.

In an advantageous embodiment, the spring washer is pretensionable or is pretensioned by means of an annular tension washer which is inserted in the bearing retainer in a form-fitting or preferably force-fitting fashion, for example in the manner of a press fit. In a suitable fashion, the tension washer has a shaft opening, configured as a passage, for the motor shaft. In order to further increase the stiffness of the tension washer, its washer outer edge is flared axially (bent upward axially), in particular in the direction in which the shaft opening configured as a passage is flared.

The direction in which the passage and the washer edge of the tension washer are flared (bent upward) is oriented in a suitable fashion in the direction of the retainer opening of the bearing retainer via which retainer opening the tension washer is inserted into the bearing retainer. The tension washer is thus, on the one hand, held securely, fixed to the housing, and, on the other hand, the tension washer can be brought as close as possible and hence in as space-saving a fashion as possible to the wave-shaped spring washer in order to pretension the latter against the outer ring of the ball bearing. In addition, the mounting of the tension washer is simplified because the respective upward bend of the edge is preferably oriented counter to the direction in which the tension washer is inserted into the bearing retainer.

In an expedient embodiment of the centering elements, the latter have a radial web or centering arm integrally formed on the inner circumference (inner radius) of the annular washer body. Three such radial webs or arms are provided in a suitable fashion. The centering elements particularly expediently have a centering section in the shape of an arc of a circle. The latter is preferably integrally formed on the associated radial webs (centering arm) on their web end (free or loose end) facing away from the inner circumference of the annular washer body.

The centering elements are particularly preferably arranged on half-wave trains (half-waves), flared axially in the same axial direction, of the wave-shaped washer body of the spring washer. The washer body of the spring washer expediently bears against the outer ring of the rolling bearing with half-wave trains, flared axially in the same axial direction, without centering elements, i.e. centering-element-free or -less half-waves. The centering elements are thus axially spaced apart from the ball bearing or its outer ring.

In the course of tensioning the spring washer, if its half-wave trains (half-waves) are moved and thus deformed axially in the direction of the ball bearing, which is preferably effected by means of the tension washer pressed into the bearing retainer on that washer side of the spring washer which faces away from the ball bearing, the centering elements retreat radially inward and thus lose contact with the motor shaft in a simple and reliable manner, quasi-automatically.

By virtue of the outer ring, pretensioned (positioned) by means of the wave-shaped spring element with centering elements, of the ball bearing, the latter can yield axially counter to the restoring force of the spring washer clamped in the bearing retainer, preferably by means of the tension washer, such that running noise during operation of the electric motor, preferably with simultaneous play-free running of the bearing, is prevented or at least reduced. In addition, an increase in the frictional torque is prevented by the spring washer because in its tensioned state the centering elements no longer bear against the motor shaft with friction or so that they grind against it.

The bearing retainer for the ball bearing (rolling bearing) is advantageously configured with a sliding fit. As a result, when the electric motor is mounted, its motor shaft is inserted with the rotor and with already assembled ball bearing (rolling bearing) into the motor housing, and the ball bearing (rolling bearing) is inserted into the bearing retainer from that bearing side of the housing bearing plate which faces the housing interior.

The ball bearing (rolling bearing) pretensioned by means of the wave-shaped spring washer with the centering elements integrally formed on the inner diameter is situated in a suitable fashion in the so-called B-side bearing plate. A receptacle for motor electronics for controlling the electric motor is expediently formed there by the preferably cylindrical housing wall of the motor housing projecting axially above the bearing plate there. Corresponding through openings for phase terminals (contacts) connected to the stator winding, which project into the receptacle and are or can be electrically contacted with the motor electronics, are provided in this housing bearing plate in a suitable fashion.

A further bearing plate with a bearing retainer for a further bearing, in particular for a rolling or ball bearing, is provided in a suitable fashion on the opposite end side of the motor housing. This bearing retainer of the so-called A-side bearing plate is expediently not configured with a sliding fit but with a retainer base on which the bearing (rolling or ball bearing) is supported. At this A-side bearing, the outer ring of the ball bearing (rolling bearing) is inserted into the bearing retainer with a press fit. Thus, this A-side bearing plate can also be assembled, as it were as a housing cap, together with the motor shaft and the rotor as well as the B-side ball bearing (rolling bearing).

When reading the specification or claim language, the following definitions apply. When the claim language recites A and/or B it means A alone, B alone or A and B. When the claim language recites at least one of A and B it means A alone, B alone or A and B. When the claim language recites at least one of A or B it means A alone, B alone or A and B. When the claim language recites a form-locking connection, it is a connection that connects two elements together due to the shape of the elements themselves (e.g. ball and socket), as opposed to a force-locking connection, which locks the elements together by force external to the elements (e.g. screw).

Other features which are considered as characteristic for the invention are set forth in the appended claims.

Although the invention is illustrated and described herein as embodied in an electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually corresponding parts and sizes are provided with the same reference signs in all the figures.

Figure 1:
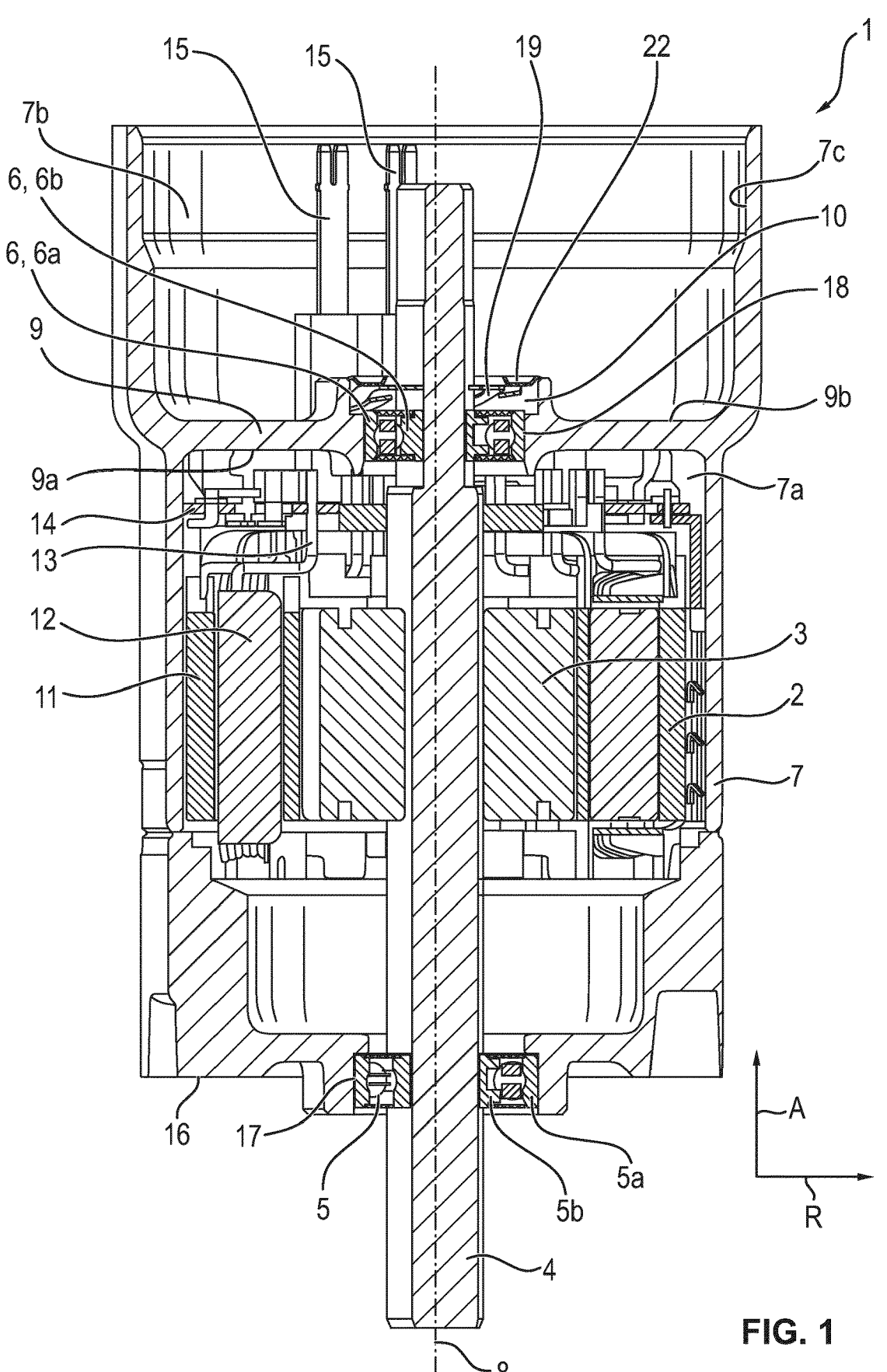
FIG. 1 is a diagrammatic, sectional view of an electric motor with a motor housing and with a stator and with a rotor on a motor shaft and with an A-side and B-side bearing plate with a ball bearing inserted therein and with a pretensioned (positioned) wave-shaped spring washer on the B-side ball bearing.

Referring now to the figures of the drawings in detail and first, particularly to FIG. 1 thereof, there is shown essential parts of an electric motor 1, which is preferably an electronically commutated inner rotor motor and is preferably used as a steering motor of a motor vehicle. The electric motor 1 has a stator 2 and a rotor 3 which is arranged fixed to a motor shaft 4. The latter is mounted so that it can move in rotation about an axis of rotation (motor axis) 8 in an A-side ball bearing 5 and in a B-side ball bearing 6 inside a motor housing 7. The axis of rotation 8 is oriented in the axial direction A which, in the same way as the radial direction R related to it, is illustrated in FIG. 1 as an arrow.

A B-side bearing plate (housing bearing plate) 9 with a bearing retainer 10 for the ball bearing 6 is provided in the cylindrical (hollow cylindrical) motor housing 7. The B-side bearing plate 9 forms a partition between a motor space 7a in which the rotor 3 with the motor shaft 4, held in the ball bearings 5, 6, and the stator 2 are arranged, and a receptacle 7b for electronics (not illustrated) for controlling the electric motor 1.

The stator 2 has a number of stator teeth 11, arranged in a star shape, which carry coils (stator coils) 12. The coils 12 are associated with their coil ends (winding wire ends) 13 with individual strands or phases and are interconnected by means of a connecting ring 14 in a star or delta connection and lead to phase terminals 15 for supplying current to the rotating-field winding.

In the case of the three-phase electronically commutated electric motor 1, the stator 2 has three phases and thus at least three phase windings to which electric current is applied in a phase-shifted fashion. They generate a magnetic rotating field within which the rotor 3 provided with permanent magnets rotates about the axis of rotation 8.

Figure 3:
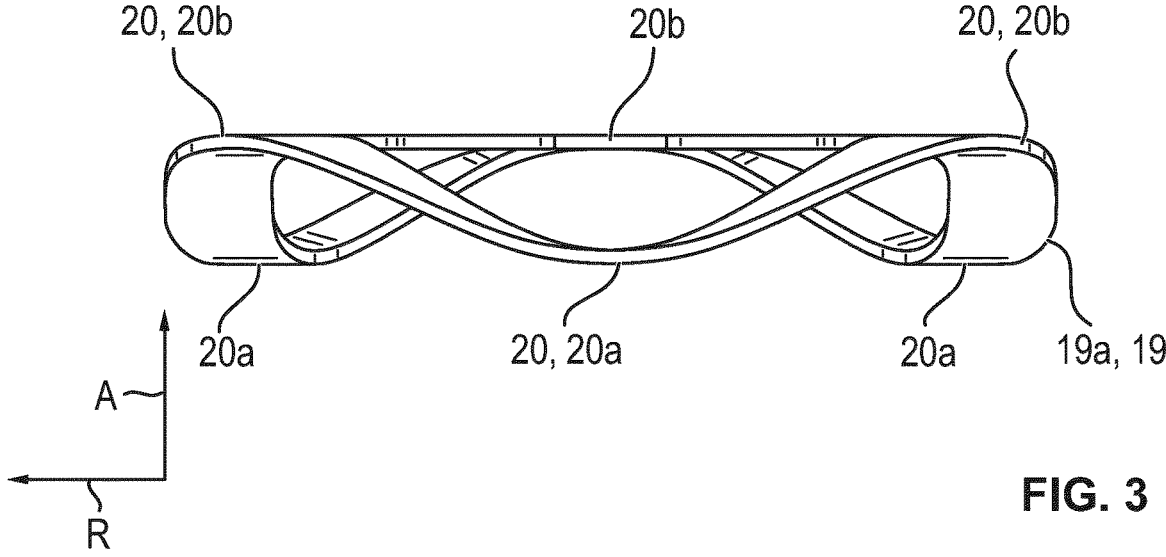
FIG. 3 is a side view of the wave-shaped spring washer with the radially inward directed centering elements at each half-wave train.
Figure 4:
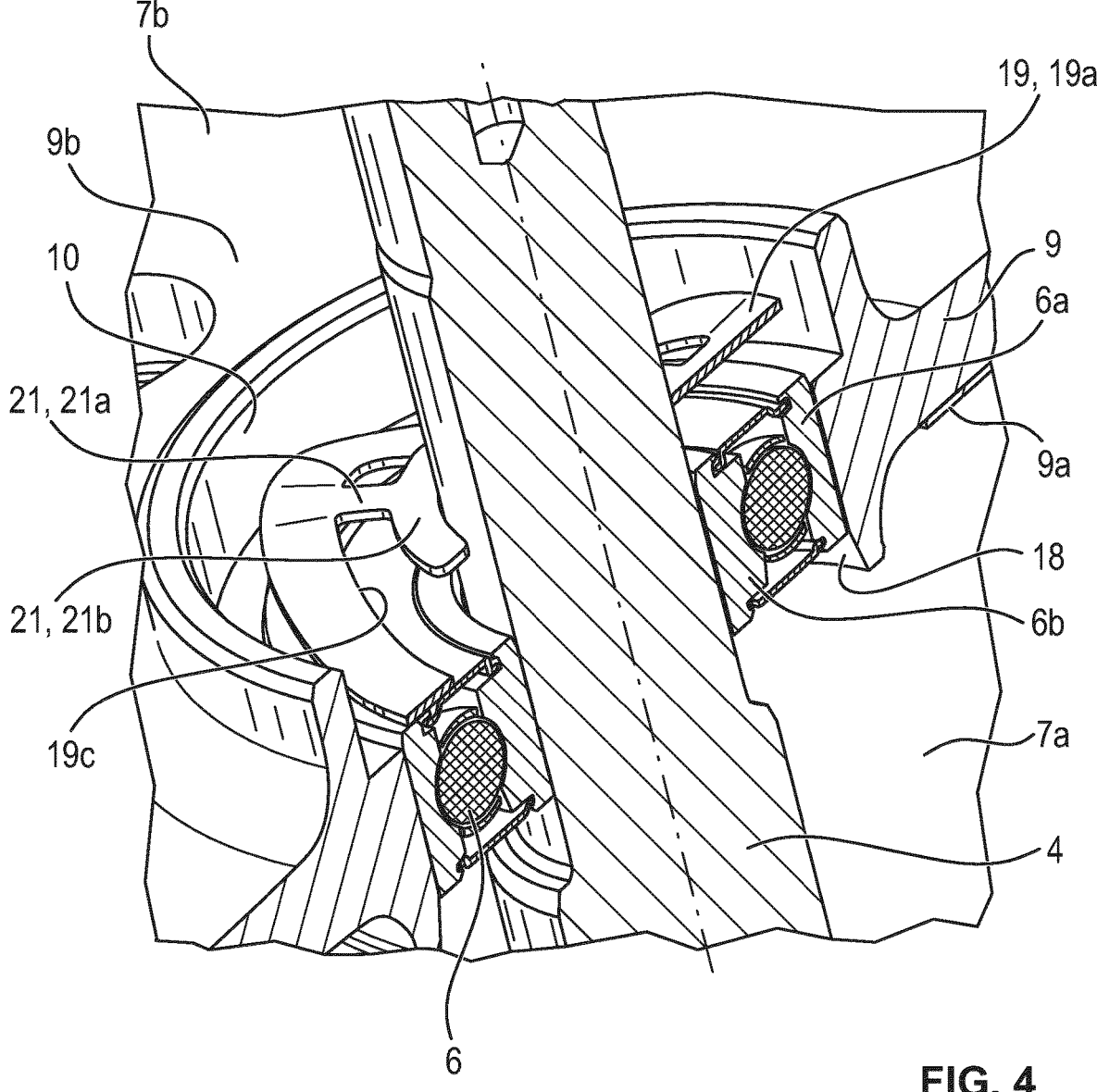
FIG. 4 is a sectional view of a detail from FIG. 1 in the region of the B-side ball bearing with a spring washer inserted in a bearing retainer and supported on the motor shaft by means of centering elements.

As can be seen in FIGS. 3 and 4, three phase contacts or terminals, only two phase contacts 15 of which can be seen, project via openings (not illustrated in detail) in the bearing plate 9, into the receptacle 7b, provided for the motor electronics, which is surrounded by a cylindrical housing section 7c, projecting axially above the bearing plate 9 there. The phase contacts or terminals 15 are connected to the coils 12 interconnected to form a stator winding (rotating-field winding) and are contacted with the motor electronics.

An A-side bearing plate 16 with a bearing seat 17 for the ball bearing 5 forms a housing cap with which the motor housing 7 is closed. The ball bearing 5 there is pressed into the bearing seat 17 with its outer ring 5a so that it is fixed to the housing, while the inner ring 5b of the ball bearing 5 is pressed onto the motor shaft 4 so that it is fixed thereto. The bearing seat 17, as a bearing retainer of the A-side bearing plate 16 for the ball bearing 5 there, is configured with a tight or press fit for the outer ring 5a of the ball bearing 5. On the housing side of the A-side bearing plate 16, the electric motor 1 can be coupled, for example, to a steering rod of a vehicle steering mechanism via its motor shaft 4 by means of a gearbox.

The axially drawn-in bearing retainer 10, having a through opening 18 for the motor shaft 4, of the B-side bearing plate 9 for the ball bearing 6 is configured with a sliding fit. This means that, although the inner ring 6b of the ball bearing 6 is again pressed onto the motor shaft 4 so that it is fixed thereto, the outer ring 6a of this ball bearing 6 just lies (with a loose fit) in the bearing retainer 10. As a result, when the electric motor 1 is mounted, its motor shaft 4 can be inserted into the motor housing 7 with the stator 2 also already accommodated therein, together with the rotor 3 fixed to the shaft and with the ball bearings 5, 6 already assembled so that they are fixed to the shaft. The ball bearing 6 fixed to the shaft is here pushed into the bearing retainer 10 from that bearing side 9a of the bearing plate 9 which faces the motor space (housing interior) 7a. The A-side bearing plate 16 can here be assembled in or on the motor housing 7 as a housing cap together with the motor shaft 4 and with the rotor 3 and with the B-side ball bearing 6.

Figure 2:
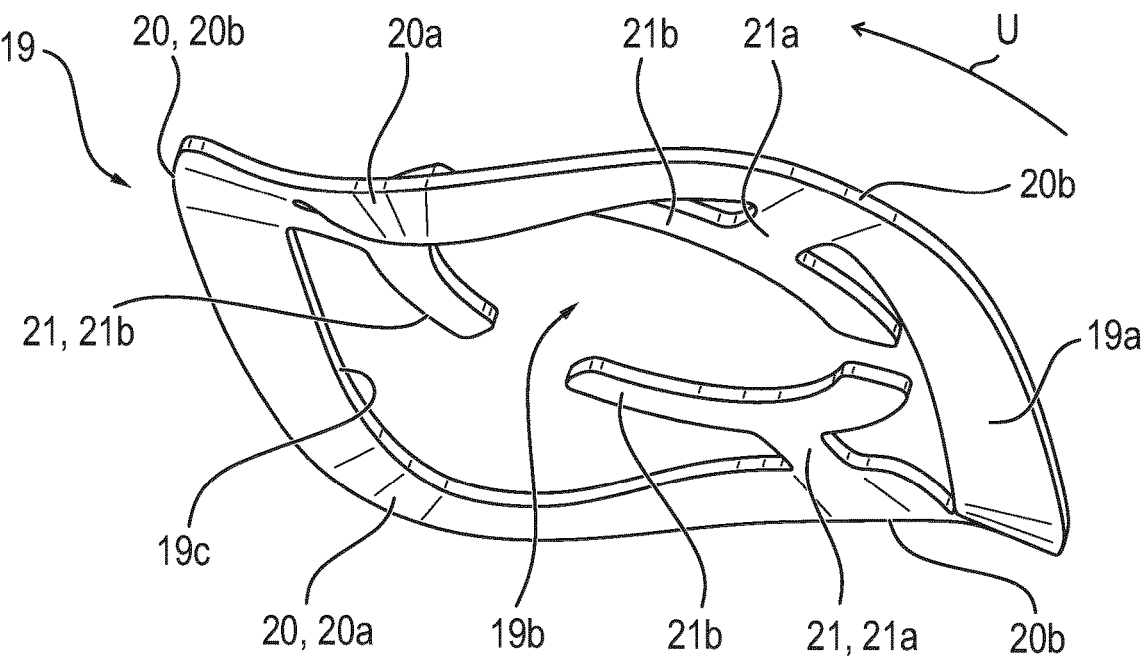
FIG. 2 is a perspective view of the wave-shaped spring washer with radially inward directed centering elements at each half-wave train.

The outer ring 6a of the ball bearing 6 is pretensioned by means of a wave-shaped spring washer 19, illustrated separately in FIGS. 2 and 3, which is inserted, on that bearing side 9*b* of the bearing plate 9 which faces away from the rotor 3 and the motor space 7*a*, in the bearing retainer 10 inside the receptacle 7*b* for the motor electronics. The wave-shaped spring washer 19 is preferably a stamped/bent part made from a strip of spring steel.

The spring washer 19 has a central shaft opening (opening) 19*b* for the motor shaft 4, and a washer body 19*a* surrounding (encircling) this opening 19*b*. The annular washer body 19*a* of the spring washer 19 has, in the circumferential direction U of the washer, a number of wave trains or wave periods 20 with alternatingly axially flared half-waves or half-wave trains 20*a*, 20*b*. In the exemplary embodiment, the spring washer 19 has three wave trains 20 with three half-waves or half-wave trains 20*a* oriented (flared) in one axial direction A and with three half-waves or half-wave trains 20*b* oriented (flared) in the opposite axial direction A.

The spring washer 19 has in the exemplary embodiment three radially inward directed centering elements 21 on the inner circumference, i.e. on the inner opening edge or inner diameter 19*c* of the annular washer body 19*a*, i.e. on the opening edge of the opening 19*b*. They each have as a centering arm a radial web 21*a* integrally formed with a fixed end on the inner circumference 19*c* of the annular washer body 19*a* of the spring washer 19. A centering section 21*b* in the shape of an arc of a circle is integrally formed on the radial web 21*a* at that web end which faces away from the inner circumference 19*c* of the annular washer body 19*a*. The centering elements 21 are arranged (integrally formed) on half-wave trains (half-waves) 20*b*, axially flared in the same axial direction A, of the wave-shaped washer body 19*a* of the spring washer 19.

Figures 5, 6:
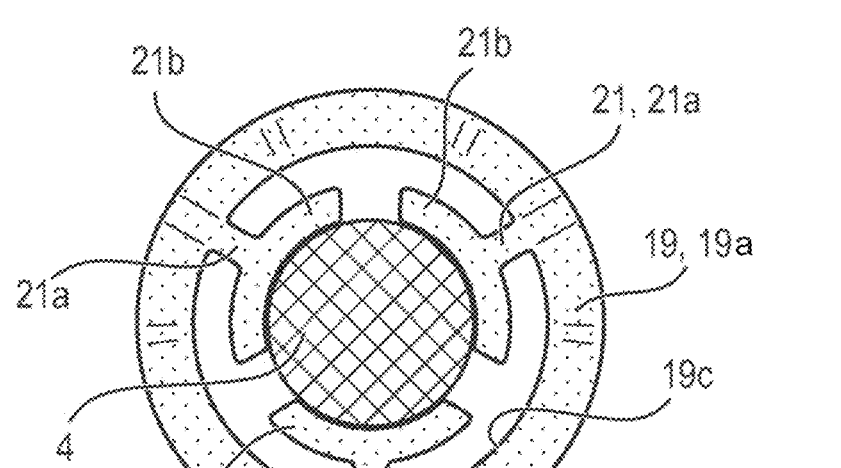
FIG. 5 is a plan view in partial section of the spring washer supported on the motor shaft via the centering elements.
FIG. 6 is a perspective and sectional view according to FIG. 4 of the spring washer pretensioned in the bearing retainer by means of a tension washer.

As can be seen in FIGS. 4 and 5, the centering sections 21*b*, in the shape of an arc of a circle, of the centering elements 21 bear against the motor shaft 4 when the spring washer 19 is untensioned. As a result, the spring washer 19 can be assembled in a fault-free fashion, as can be seen in FIG. 4. When it is mounted, the spring washer 19 is thus supported on the motor shaft 4, and centered thereon, via the centering elements 21.

As can be seen in FIG. 6, the spring washer 19 is pretensionable by means of an annular tension washer 22 inserted in force-fitting fashion in the bearing retainer 10 and is pretensioned or positioned by the tension washer 22 in the course of mounting. The tension washer 22 has a shaft opening 22*a*, configured as a passage, for the motor shaft 4. The stiffness of the tension washer 22 is already increased by means of the passage in the form of an axial flaring or bending upward of the opening edge 22*b* of the tension washer 22. In order to further increase the stiffness of the tension washer, its washer outer edge 22*c* is also flared axially, and to be precise in the same axial direction A as the central passage 22*b* of the tension washer 22.

The direction in which the passage 22*b* and the washer edge 22*c* of the tension washer 22 are flared (bent upward) is oriented in the direction of the retainer opening 23, arranged in the receptacle 7*b* of the motor housing 7, of the bearing retainer 10, via which retainer opening 23 the tension washer 22 is inserted into the bearing retainer 10 and pressed in there. The washer body 19*a* of the wave-shaped spring washer 19 bears against the outer ring 6*a* of the ball bearing 6 with those of the wave half-trains 22*b*, flared axially in the same axial direction A, on which no centering elements 21 are provided. The centering elements 21 are thus axially spaced apart from the ball bearing 6 and from its outer ring 6*a*. This can be seen in FIGS. 4 and 6 and in FIG. 3.

Figure 7:
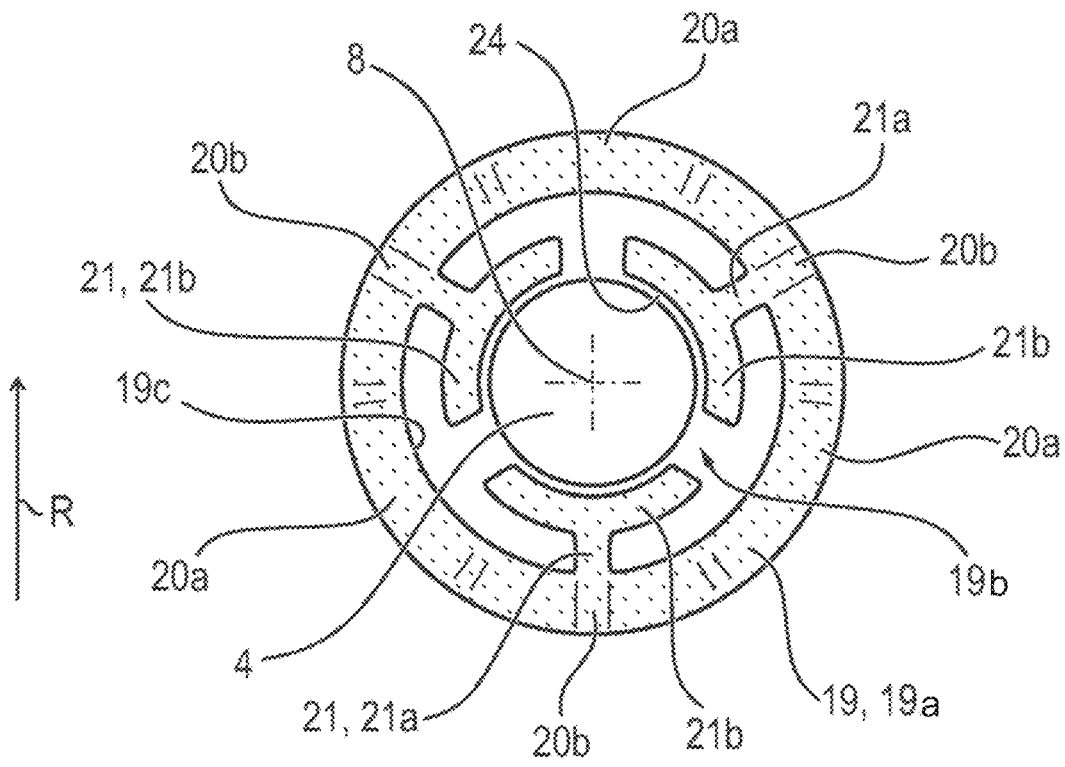
FIG. 7 a plan view according to FIG. 6 of the pretensioned spring washer with the formation of a gap between the centering elements and the motor shaft.

FIG. 7 illustrates the spring washer 9, placed onto the motor shaft 4, with its centering elements 21 in the tensioned (positioned) state. In the course of the tensioning of the spring washer 19, its half-wave trains (half-waves) 22*a*, 22*b* are moved axially in the direction of the ball bearing 6 by means of the tension washer 22. The wave-shaped spring washer 19 and its washer body 19*b* are thus deformed. Consequently, the centering elements 21 retreat radially inward and thus lose contact with the motor shaft 4 with the formation of a (shaft) gap 24.

In summary, the invention relates to an electric motor 1 with a motor shaft 4 which is arranged in a motor housing 7, wherein the motor shaft 4 is mounted so that it can move in rotation about an axis of rotation 8 in at least one rolling or ball bearing 6, inserted in a bearing retainer 10, with an outer ring 6*a* and with an inner ring 6*b* fixed to the motor shaft 4. The outer ring 6*a* of the rolling bearing 6 is pretensioned by means of a spring washer 19 which is inserted in the bearing retainer 10 and has a number of wave trains 20 with alternatingly axially flared half-wave trains 20*a*, 20*b*. The spring washer 19 has on the inner circumference 19*c* a number of centering elements 21 which bear against the motor shaft 4 when the spring washer 19 is untensioned and is spaced apart, in the tensioned state of the spring washer 19, from the motor shaft 4, in particular with the formation of a (shaft) gap 24.

The claimed invention is not limited to the abovedescribed exemplary embodiments. Rather, other variants of the invention can also be derived therefrom by a person skilled in the art within the scope of the disclosed claims without going beyond the subject-matter of the claimed invention. In particular, all the individual features described in connection with the various exemplary embodiments can moreover be combined in a different fashion within the scope of the disclosed claims without going beyond the subject-matter of the claimed invention.

In addition, the described solution can be used not only in the specific illustrated use case but also in a similar design for other motor vehicle applications such as, for example, door and tailgate systems, window lifters, vehicle locks, adjustable seat and interior systems as well as for other electrical drives, for example a brake booster, in the vehicle.

The following is a summary list of reference numerals and the corresponding structure used in the above description of the invention.

LIST OF REFERENCE SIGNS

1 electric motor
2 stator
3 rotor
4 motor shaft
5 (A-side) ball bearing
5*a* outer ring
5*b* inner ring
6 (B-side) ball bearing
6*a* outer ring
6*b* inner ring
7 motor housing
7*a* motor space
7*b* (electronics) receptacle
7*c* housing section
8 axis of rotation
9 (B-side) bearing plate 9a, 9b bearing side
10 bearing retainer
11 stator tooth
12 coil
13 coil end
14 connecting ring
15 phase terminal/contact
16 (A-side) bearing plate
17 bearing seat
18 through opening
19 spring washer
19a shaft opening/opening
19b washer body
19c inner circumference/opening edge
20 wave train/period
20a half-wave/half-wave train
20b half-wave/half-wave train
21 centering element
21a radial web/centering arm
21b centering section
22 tension washer
22a shaft opening
22b opening edge/passage
22c washer outer edge
23 shaft gap/gap
A axial direction
R radial direction
U circumferential direction

The invention claimed is:

1. An electric motor, comprising:
a stator;
a motor shaft;
a motor housing;
at least one roller bearing with an outer ring and an inner ring;
a rotor disposed non-rotatably on said motor shaft and further disposed in said motor housing, said rotor being mounted so that it can move in rotation about an axis of rotation in said at least one rolling roller bearing with said inner ring fixed to said motor shaft;
a bearing retainer, said at least one rolling roller bearing disposed in said bearing retainer;
a spring washer including a washer body with an inner circumference, said washer body including axially flared half-waves extending in a same axial direction, said axially flared half-waves, which extend in the same axial direction, provided with centering elements formed at said inner circumference, said washer body also including axially flared half-waves extending in an axial direction opposite the same axial direction, said axially flared half-waves, which extend in the axial direction opposite the same axial direction, being without centering elements and contacting said outer ring of said at least one rolling roller bearing, said spring washer configured such that said centering elements contact said motor shaft only in an untensioned state for assembly centering and such that said centering elements are spaced apart from said motor shaft in a tensioned state during operation thereby avoiding frictional contact with said rotating shaft; and
an annular tension washer with a drawn-through opening and an axially flared outer rim being press-fit in said bearing retainer to pretension said spring washer against said outer ring of said at least one rolling roller bearing.

2. The electric motor according to claim 1, wherein said annular tension washer has a shaft opening formed therein and, configured as a passage, for said motor shaft.

3. The electric motor according to claim 2, wherein said annular tension washer has a washer outer edge which is flared axially.

4. The electric motor according to claim 3, wherein said washer outer edge is flared axially in a direction in which said shaft opening configured as a passage is flared.

5. The electric motor according to claim 1, wherein said radially inward directed centering elements each have a radial web integrally formed on said inner circumference of said annular washer body.

6. The electric motor according to claim 5, wherein said radially inward directed centering elements each have a centering section in a shape of an arc of a circle.

7. The electric motor according to claim 6, wherein said centering section in the shape of the arc of the circle is integrally formed on said radial web on a web end facing away from said inner circumference of said annular washer body.

8. The electric motor according to claim 1, wherein said spring washer is a wave-shaped spring washer, said centering elements are radially inward directed centering elements, and said spring washer is a stamped/bent part.

9. The electric motor according to claim 8, wherein said radially inward directed centering elements are made from a strip of spring steel.

* * * * *